United States Patent [19]
Basham et al.

[11] 4,289,024
[45] Sep. 15, 1981

[54] WELL CASING FREE-POINT INDICATOR

[75] Inventors: Edward R. Basham, Fort Worth; L. Max Mosely, Arlington, both of Tex.

[73] Assignee: Gearhart Industries, Inc., Fort Worth, Tex.

[21] Appl. No.: 107,332

[22] Filed: Dec. 26, 1979

[51] Int. Cl.$^3$ .............................................. E21B 47/00
[52] U.S. Cl. ...................................... 73/151; 323/362
[58] Field of Search ......................... 73/151; 166/255; 323/89 MS, , 90, 92; 336/229

[56] References Cited

U.S. PATENT DOCUMENTS

| | | | |
|---|---|---|---|
| 2,380,242 | 7/1945 | Jewell | 323/89 MS |
| 3,305,770 | 2/1967 | Hulls | 323/92 X |
| 3,670,566 | 6/1972 | Basham et al. | 73/151 |
| 3,690,163 | 9/1972 | Shannon et al. | 73/151 |

Primary Examiner—Jerry W. Myracle
Attorney, Agent, or Firm—Jim Peppers

[57] ABSTRACT

Improvement in free point indicators disclosed in U.S. Pat. No. 3,690,163. Discloses new strain sensing system having all electrical/electronic components, other than coil and diode components, located at earth's surface remote from high temperatures and shock loading. Includes a toroidal armature within the downhole tool having coils or windings to generate a pulsating magnetic flux field developed by an alternating current. A U-shaped permanent magnet is disposed such that a portion of its constant magnetic flux field occupies physical space common with a portion of the pulsating magnetic flux field for mutual influence. A diode provided in series with each winding limits electrical current passing through each winding to pulsating DC. The constant flux of the magnet and the pulsating flux of the coils are relatively positioned in opposing sense whereby the current passing through each winding is of designated magnitude. Any relative movement between the magnet and the toroidal armature results in change of net current flow which is measured at the earth's surface as a DC voltage. The preferred embodiment utilizes two windings symetrically wound around the armature. However, the invention can be successfully utilized with only one winding.

10 Claims, 4 Drawing Figures

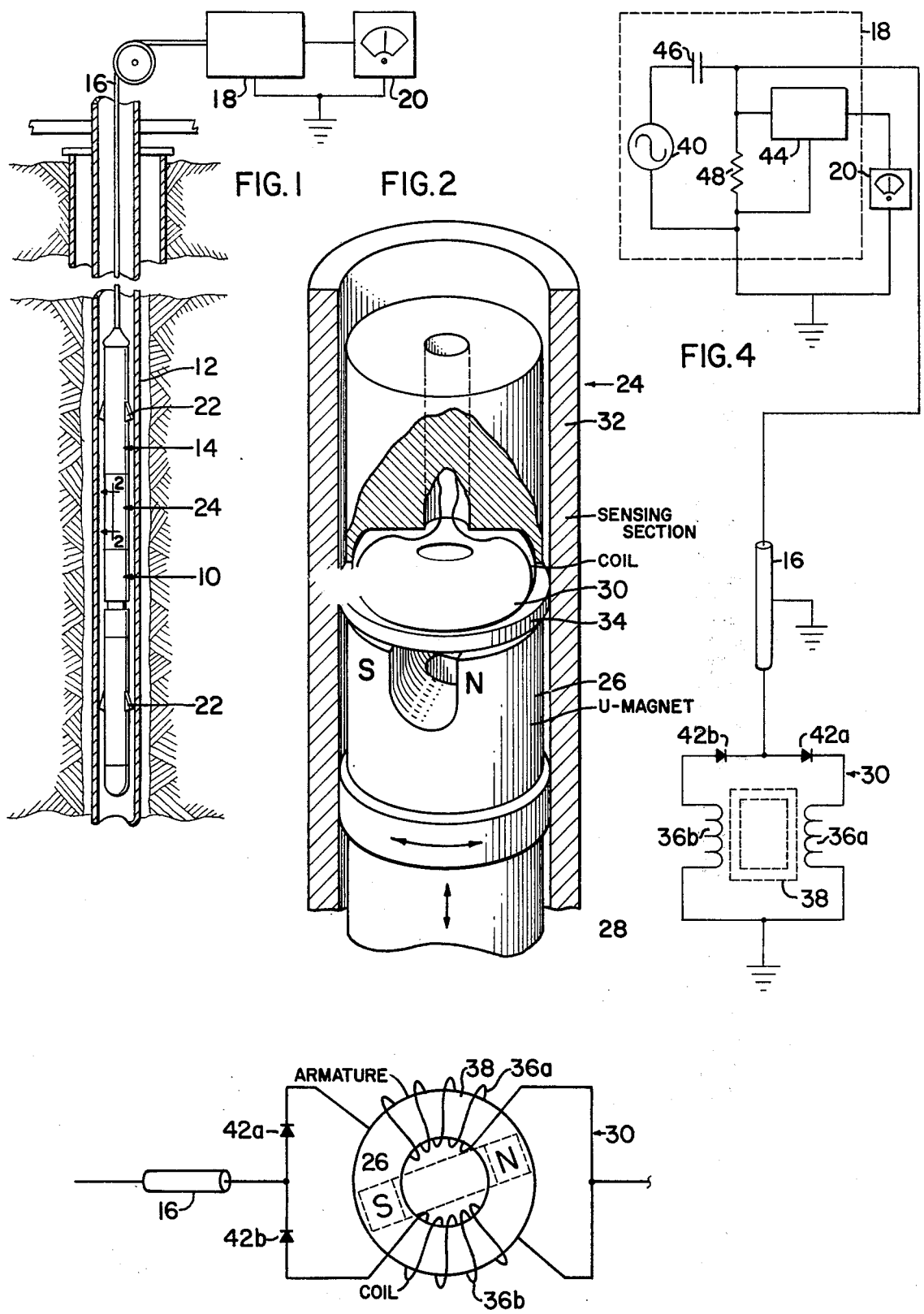

WELL CASING FREE-POINT INDICATOR

This invention relates to improvements in a downhole tool for locating the stuck point of well casing in a bore-hole and is an improvement to the inventions disclosed in U.S. Pat. Nos. 3,670,566 and 3,690,163.

BACKGROUND OF THE INVENTION

The most pertinent prior art to the present invention is disclosed in U.S. Pat. Nos. 3,690,163 and 3,670,566, which are incorporated herein by reference.

SUMMARY OF THE INVENTION

The principal object of this invention is to provide a downhole conduit free-point sensing tool which is simple, less expensive and, more importantly, that has substantially fewer downhole electrical parts as may be subjected to the shock and high temperatures of well bore environments.

The downhole system comprises a toroidal armature disposed within the tool and having a first and second coil or winding respectively would around an arcuate segment of the toroidal armature so that each coil may generate a pulsating magnetic flux field responsive to a pulsating current impressed through the coil. A U-shaped permanent magnet, which generates a constant magnetic flux field between its poles, is disposed in position where a portion of the constant flux field occupies physical space common with a portion of the pulsating magnetic flux field for mutual influence therebetween. A diode is provided in series with each coil to limit the current through each coil to pulsating DC. The magnet and the coils are disposed so that the pulsating flux field is positioned with respect to the constant flux field in a sense whereby the net current through each coil can be of preselected and designated magnitude. The net direct current is adapted to pass through the conductor between each coil and the earth's surface. At the earth's surface, a receiving and indication means is adapted to indicate the pulsating current as a DC voltage. This indicated voltage is a function of the relative position, and changes in position, of the magnet with respect to the toroidal armature. Though the tool is herein disclosed as utilizing two coils or windings for optimum performance, a system utilizing only one coil is operable and can be successfully utilized.

BRIEF DESCRIPTION OF THE DRAWING

FIG. 1 is a schematic side elevational view of the invention showing the downhole sensing tool in position within a well casing.

FIG. 2 is a side perspective section generally taken at 2—2 of FIG. 1 and schematically showing the toroidal coil as positioned relative to the permanent magnet of the present invention.

FIG. 3 is a somewhat more detailed schematic view of the toroidal coils or windings of the present invention, including the windings as wound around the toroidal armature.

FIG. 4 is a schematic illustration of the complete circuit of the present invention.

DESCRIPTION OF THE DISCLOSED EMBODIMENT

Referring to FIG. 1, there is shown the tool 10 as employed as free point indicator in a conduit 12 such as drill pipe, or casing, in a borehole. As is well known, when a conduit such as 12 becomes stuck in a borehole, then torsion or tension applied to the conduit above the point of sticking will result in flexure or strain in the conduit. Such stress may be applied to the conduit either in tension, in torsion, or both, by derrick machinery at the earth's surface (not shown).

As shown in FIG. 1, the tool 10 is suspended by means of a conductor cable 16 from the earth's surface. The conductor in the cable is connected at the upper end of the cable into a surface receiver means 18 and also into a recorder and/or indicator 20.

The surface receiver means 18 is simply shown in block form and includes means (not shown) to indicate casing collars, to indicate the depth of tool 10, and to actuate the upper and lower gripper feet or dogs 22 as shown and later mentioned. All such means are well known and are amply shown in the referenced prior art patents, for example.

The surface receiving means 18 also includes AC voltage generating means 40 and DC receiving means 44. Also as shown, the indicator 20 is connected into the surface means 18 and adapted to indicate the received DC from means 44 as a voltage which varies as a function of relative movement between the dogs 22 at the opposite ends at tool 10, as later described.

The cable 16 will have at least one conductor insulated from the cable sheath or strands which is serially connected between the downhole tool 10 and the surface means 18.

The heart of the sensing means of the free-point indicator is illustrated in FIG. 2 as the sensing section 24.

As shown, a permanent magnet 26 is held fixedly in place by a chassis 28 forming part of the lower section of tool 10. A toroidal sensing coil 30 is disposed in a cylinder 32 which forms a part of the upper section of tool 10. Sensing coil 30 senses the change in the net magnetic flux field as caused by relative movement between the magnet 26 and the sensing coil 30. As evident, chassis 28 and cylinder 32 are permitted relative movement therebetween.

The sensing coil 30 is maintained with spaced apart relationship from fixed magnet 26 and is separated from the fixed magnet 26 by a non-magnetic disc 34. All the elements of the sensing means 24 as well as other elements of the bore-hole tool 14 are provided by longitudinal passageways so that suitable electrical conductors may be provided therethrough.

Now referring to FIGS. 3 and 4, taken in view of FIG. 2, the sensor coil circuit herein described is sensitive to both torque and stretch measurements of a tubular member such as the casing 12 shown.

In FIGS. 3 and 4, there are shown windings 36a and 36b wound around a closed loop armature, shown in FIG. 3 as a toroidal armature 38, to constitute coil 30. These coils are driven by an alternating current source 40 located as part of the surface equipment 18. In this application, the AC source or generator 40 generates a sine wave signal at 2000 hertz, for example.

The windings 36a and 36b are commonly connected to ground as shown and connected through diodes 42a and 42b into the conductor of cable 16. The thin non-magnetic bulk-head 34 shown in FIG. 2 actually forms a portion of housing 32 and separates the toroidal coil 30 from the U-Magnet 26.

The 2000 hertz current flows alternately through each of windings 36a and 36b, as permitted by diodes 42a and 42b, as a pulsating DC. To be noted, is that the two coils 36a and 36b are wound around the body of the armature 38 symetrically and in serially wound relation. The connection through diodes 42a and 42b to the conductor of cable 16 is such that sinusoidal current from generator 40 passes through the coil 36a in a first polarity and through coil 36b in the opposite polarity.

As best shown in FIG. 3, the N-S poles of the magnet 26 are disposed in adjustably predetermined relationship with respect to windings 36a and 36b. FIG. 3 shows the magnet 26 to be disposed at about 20° with respect to an axis symetrically disposed between the coils, but the magnet 26 can be arcuately rotated to other positions with respect to the coils to find a position for designated currents to flow through the windings, from say 10° to 55°, for example.

The 2000 hertz current flows alternately through the windings 36a and 36b. Any change in position of constant magnetic flux field as provided by the permanent magnet 26 either adds to or subtracts from the effective flux field produced by the 2000 hertz current through the coils. Any resulting change in current flow appears as a DC voltage shift by the voltmeter 20 via a low pass filter 44 as shown.

Referring more particularly to FIG. 4, the elements shown below cable 16 are housed within sub-surface tool 10, and the elements above the cable are housed at the earth's surface with conventional wireline well service equipment.

The U-Magnet 26 is mounted with a plane defined between its N-S poles and in spaced apart and substantially parallel relation with a plane defined across the major circular diameter of the armature. Since the magnet and the armature are relatively positioned apart along the axis of the tool 14, and positioned in rotational relation to each other about the axis of the tool, the constant magnetic flux field generated between the N-S poles of the magnet is positioned accordingly with respect to the pulsating magnetic flux field developed about the armature 30.

The windings or coils 36a and 36b are serially wound about the armature and pulsed with current in opposing relationship as directed by diodes 42a and 42b. The magnet and the armature may be relatively positioned to cause a designated, but unequal magnitude of current flow through each of coils 36a and 36b. Axial movement of the magnet 26 relative to coils 36a and 36b, as caused by stretch in casing 12 between dogs 22, or rotational movement of the magnet relative to the coils, as caused by rotational strain of casing 12 between dogs 22, causes the resulting magnetic flux field established by the magnet and the coils to change. The relative current flow through the coils also changes, causing a different current flow through each coil. At the earth's surface such relative current flow shows on indicator 20 as a relative movement between the dogs 22 as caused by strain in casing 12.

Such strain in casing 12 occurs at a free point above where the casing is stuck.

It is to be noted that the system will function as intended with provision of only one of the two windings 36a and 36b. With one winding, the magnet and armature may be positioned so that a pulsating direct current of designated magnitude may flow continuously through the single winding. The resulting voltage at indicator 20 may be calibrated as desired, then, any movement between dogs 22 will show as a voltage change at indicator 20.

The few electrical components of the present invention which are subject to elevated downhole temperatures permit the free-point indicator tool 10 shown in FIG. 1 to be utilized at temperatures of at least 100° F. higher than the prior art tool shown in U.S. Pat. Nos. 3,670,566 and 3,690,163 for example, and with the few downhole components more resistant to breakage from impact.

OPERATION OF THE DISCLOSED EMBODIMENT

In operation, and referring to FIG. 1, the borehole tool 10 is lowered into the borehole to a predetermined depth relative to casing 12. The depth is ordinarily near the estimated stuck point of the casing in the borehole.

The extension and retraction of dogs 22 are explained in the referenced prior art patents. With the feet or dogs 22 engaged against the inner wall of casing 12, a stress is imparted to casing 12 from the surface as by rotating and/or by lifting upwardly for inducing stress and corresponding strain. The degree of movement, if any, of the respective points of attachment will be slightly different for the lower portion and for the upper portion of tool 10. Accordingly, the sensing means 24 will indicate relative movement between the upper portion and lower portions of tool 10 on indicator 20, since the moveable magnet 26 will be moved with respect to the sensing coil 30.

It should be realized of course that the conduit can be stressed before the attachment means are engaged with the members and, in this latter case, the movement will be in the opposite direction when the stress is released.

There will be no relative movement if the conduit is stuck in the borehole at a point above the location of the borehole tool 10. The stress induced at the surface will be absorbed by the sticking components at the point where the conduit is stuck and there will be no attendant strain at the depth at which the borehole tool 10 is releasably connected with the casing 12.

The borehole tool 14 may be moved to a plurality of locations and the attachment members 22 moved outwardly to releasably interconnect the casing 12 any number of times on a single trip into the well and without returning to the surface.

It can be seen from the foregoing descriptive matter and drawings that the invention accomplishes the objects, and provides the features indicated to be desirable and not heretofore provided by the prior art devices.

Although the invention has been described with some particularity, it is understood that the present disclosure is made only by way of example and that numerous changes in the details of construction, and the combination and arrangement of elements, may be made without departing from the spirit and the scope of the invention as herein defined.

I claim:

1. In a free-point locator apparatus adapted to sense strain imposed by stress applied to well conduit the combination of:
   (a) a closed loop armature disposed within the downhole tool of said apparatus and provided with at least one winding, with each said winding respectively would around an arcuate segment of said armature to respectively generate a pulsating magnetic flux field in response to an electrical current impressed through said winding;
   (b) a diode respectively provided in series with said winding to limit electrical current passing through said winding to direct current and thereby develop a pulsating magnetic flux field corresponding to said electrical current;

(c) a permanent magnet for generating a constant magnetic flux field between its poles and disposed in a position where a portion of said constant flux field occupies a space common with a portion of said pulsating flux field for mutual influence therebetween; and (d) said constant flux field and said pulsating flux field being relatively positioned in a sense such that the resulting electrical current passing through each said winding is a pulsating direct current of a designated amplitude which changes corresponding to change in position between said permanent magnet and said armature;

(e) said resulting current being adapted to pass through a conductor from each said winding to the earth's surface.

2. The apparatus of claim 1 further including receiving means connected to said conductor at said surface and adapted to indicate said resulting electrical current as a function of the relative position and change in position of said permanent magnet with respect to said armature.

3. The apparatus of claim 1 wherein said permanent magnet is a U-shaped magnet.

4. The apparatus of claim 1 further including an electrical current generator for supplying alternating current to said winding.

5. The apparatus of claim 1 further including means for detecting the current passing through said winding and indicating the magnitude and any change in magnitude of said current.

6. The apparatus of claim 1 wherein said downhole tool is provided with means to engage a well conduit in two spaced apart locations and translate any movement of said conduit between said locations into corresponding movement between said magnets and said armature.

7. The apparatus of claim 1 including two respective elements of said winding.

8. The apparatus of claim 7 wherein said permanent magnet is a U-shaped magnet.

9. The apparatus of claim 8 further including receiving means connected to said conductor at said surface and adapted to indicate said resulting electrical current as a function of the relative position and change in position of said permanent magnet with respect to said armature.

10. The apparatus of claim 9 further including means for detecting the current passing through said winding and indicating the magnitude and any change in magnitude of said current.

* * * * *